(12) United States Patent
Bohra et al.

(10) Patent No.: US 8,539,498 B2
(45) Date of Patent: Sep. 17, 2013

(54) INTERPROCESS RESOURCE-BASED DYNAMIC SCHEDULING SYSTEM AND METHOD

(75) Inventors: Subash Bohra, Oak Park, CA (US); Scott Nam, Granada Hills, CA (US)

(73) Assignee: Alcatel Lucent, Paris (FR)

( * ) Notice: Subject to any disclaimer, the term of this patent is extended or adjusted under 35 U.S.C. 154(b) by 1826 days.

(21) Appl. No.: 11/749,810

(22) Filed: May 17, 2007

(65) Prior Publication Data
US 2008/0288949 A1 Nov. 20, 2008

(51) Int. Cl.
G06F 9/46 (2006.01)

(52) U.S. Cl.
USPC .......................... 718/104; 718/102; 718/103

(58) Field of Classification Search
USPC .......................................................... 718/102
See application file for complete search history.

(56) References Cited

U.S. PATENT DOCUMENTS

| | | | | |
|---|---|---|---|---|
| 6,687,257 B1* | 2/2004 | Balasubramanian | ......... | 370/429 |
| 6,704,409 B1* | 3/2004 | Dilip et al. | ............... | 379/265.02 |
| 7,170,900 B2* | 1/2007 | Berggreen | ..................... | 370/412 |
| 7,302,450 B2* | 11/2007 | Benedetti et al. | ..................... | 1/1 |
| 7,559,062 B2* | 7/2009 | Code et al. | ..................... | 718/102 |
| 7,627,618 B2* | 12/2009 | Honigfort | ............................. | 1/1 |
| 8,095,930 B2* | 1/2012 | Chew | ........................... | 718/103 |
| 2003/0037091 A1* | 2/2003 | Nishimura et al. | ........... | 709/103 |
| 2003/0065809 A1* | 4/2003 | Byron | .......................... | 709/232 |
| 2003/0081764 A1* | 5/2003 | Kosanovic et al. | ...... | 379/406.01 |
| 2005/0076043 A1* | 4/2005 | Benedetti et al. | ............ | 707/100 |
| 2005/0177832 A1* | 8/2005 | Chew | ............................ | 718/104 |
| 2007/0106636 A1* | 5/2007 | Sridharan et al. | ................ | 707/2 |
| 2008/0086734 A1* | 4/2008 | Jensen et al. | .................. | 718/104 |

* cited by examiner

Primary Examiner — Jennifer To
(74) Attorney, Agent, or Firm — Hitt Gaines, PC (57) ABSTRACT

A method and system for scheduling tasks in a processing system. In one embodiment, the method comprises processing tasks from a primary work queue, wherein the tasks consume resources that are operable to be released. Whenever the volume of resources that have been consumed exceeds a threshold, the processor executes tasks from a secondary work queue for a period of time. The secondary work queue is comprised of tasks from the primary work queue that can release the resources; the secondary work queue can be sorted according to the volume of resources that can be released.

20 Claims, 7 Drawing Sheets

INTERPROCESS RESOURCE-BASED DYNAMIC SCHEDULING SYSTEM AND METHOD

BACKGROUND OF THE INVENTION

1. Technical Field of the Invention

The present invention generally relates to process scheduling. More particularly, and not by way of any limitation, the present invention is directed to a system and method for scheduling processes or tasks, based at least in part on the resources that are pending for each process.

2. Description of Related Art

In many computing systems using one or more processors, various resources are generally scarce. For example, an embedded system is a special-purpose system in which the processor is dedicated to a specific purpose and is completely encapsulated by the device it controls, such as a traffic light, MP3 player or Ethernet switch, in which not only is processor time scarce, but other resources are also limited. In general, the order in which processes are taken up by the processor and the amount of time allotted to each process is managed by a scheduler using an algorithm that seeks to order the execution according to the needs of the specific system.

SUMMARY OF THE INVENTION

Embodiments of the present disclosure are directed to a system and method for scheduling tasks in an environment having limited resources and in which the availability of these resources is important to the operation of the system.

One embodiment of the invention is a method for scheduling tasks in a computer system. The method comprises processing tasks from a primary work queue. The tasks consume interprocess communication resources operable to be released after their use. Whenever the volume of interprocess communication resources that have been consumed exceeds a threshold, the processor executes tasks from a secondary work queue for a period of time. The secondary work queue comprises tasks from the primary work queue that can release the greatest volume of interprocess communication resources.

Another embodiment of the invention is a method for scheduling tasks in a processor. The method comprises maintaining a list of resources pending for tasks in a primary work queue during execution of those tasks from the primary work queue. After a first time period, a determination is made whether a threshold of resources pending has been exceeded and if the threshold has been exceeded, populating a secondary work queue with tasks having resources pending, the secondary work queue being sorted according to a given factor, and executing tasks from the secondary work queue for a second time period before returning to the execution of tasks from the primary work queue.

Another embodiment of the invention is a system having means for populating a first work queue with tasks, means for monitoring resources pending for each of the tasks, means for populating a second work queue with tasks identified by the means for monitoring, wherein the second work queue is ordered according to a given factor and means for alternating processing of tasks from the first work queue and the second work queue based at least in part upon determining that the resources pending have exceeded a threshold.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Embodiments of the invention will now be described with reference to various examples of how the embodiments can best be implemented and used. Like reference numerals are used throughout the description and several views of the drawings to indicate like or corresponding parts, wherein the various elements are not necessarily drawn to scale.

Figure 1A:
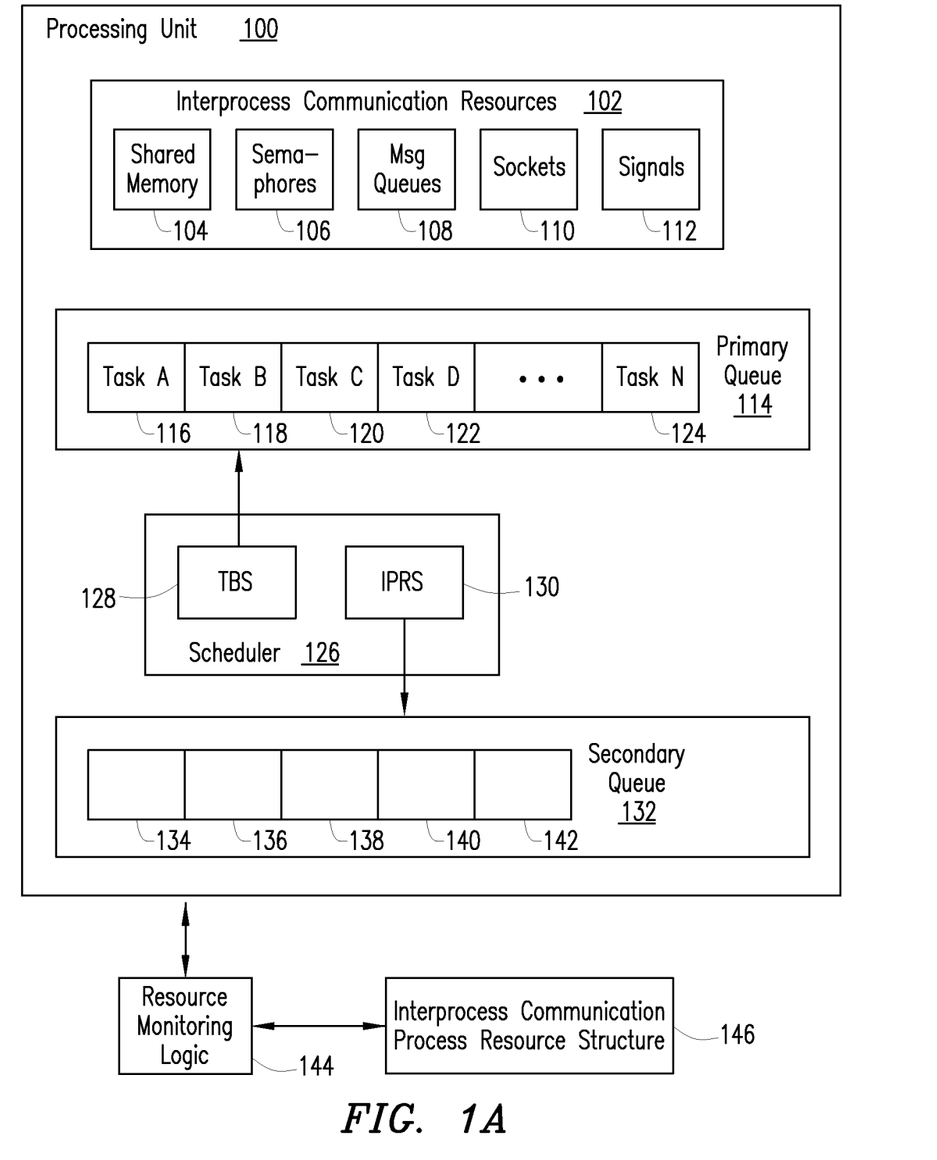
FIG. 1A discloses a system in which an embodiment of the present invention is implemented.

Referring now to FIG. 1A, an exemplary processing unit in which an embodiment of the inventive scheduling method may be implemented is shown and generally designated 100. Processing unit 100 is of a multitasking design, i.e., processing unit 100 switches from task to task as necessary to provide maximum usage of the processor. An effective scheduler is necessary to manage the multi-tasking, especially when a high volume of tasks and various quality of service requirements are part of the environment.

In the context of this application, a task may be defined as a program for execution in the computer combined with the associated overhead information used by the operating system. Additionally, in the context of this application, a task may be considered the same as a process for purposes set forth below. When a task is preempted during execution, all of the current data, states, etc. must be saved for later restoration. A task can spawn tasks, can call tasks and can communicate with other tasks.

Continuing to refer to FIG. 1, in order to facilitate the necessary communication between different tasks, processing unit 100 contains a number of interprocess communication resources 102. By way of illustration, the exemplary embodiment contains five types of interprocess communication resources 102: shared memory 104, semaphores 106, message queues 108, sockets 110 and signals 112. One skilled in the art will recognize that processing unit 100 can contain a greater or lesser number of interprocess communication resources. Additionally, the specific interprocess communication resources used by processing unit 100 can include any of the disclosed interprocess communication resources, other interprocess communication resources not listed herein or any combination thereof.

Each type of interprocess communication resources 102 may be embodied in suitable implementations wherein each type of interprocess communication resources 102 has a defined upper limit in terms of the number and/or the size of the resource that is implemented. The scarcity of resources mandates that a resource be released to general use as soon as the resource is no longer needed. Accordingly, it should be appreciated that when the need to release resources is not taken into account in the scheduling of tasks, a shortage of resources can cause the system to fail.

For example, a high priority task receives network-generated traffic, which is then passed to other tasks for processing. The receiving tasks may have a lower priority than the high priority task, so that the receiving tasks can only execute when the high priority task is not active. The act of passing this traffic to the receiving tasks requires the use of one or more sockets 110 and let us assume the exemplary system has only one hundred sockets available. If a large amount of network traffic is directed to the high priority task for a long period of time, the high priority task may consume or use all of the available sockets without giving up processor time that would allow the receiving tasks to handle the incoming traffic and free up sockets. This situation can lead to a state of deadlock and, if the embedded system is an Ethernet switch, the switch may freeze up.

Referring again to FIG. 1A, processing unit 100 has both a primary work queue 114 and a secondary work queue 132, each controlled by a portion of scheduler 126. As tasks are received in processing unit 100, these tasks are placed into primary work queue 114. By way of example, primary work queue 114 currently contains a plurality of tasks, such as Task A 116, Task B 118, Task C 120, Task D 122, Task N 124. The ordering of primary queue 114 is directed by task-based scheduler 128. Without limitation to the present invention, task-based scheduler 128 uses algorithms such as preemptive priority scheduling, weighted round robin scheduling, weighted deficit round robin or other known techniques that provide scheduling according to the needs of the system.

Secondary work queue 132 is shown as empty in FIG. 1A, but contains a plurality of slots, e.g., slots 134, 136, 138, 140, 142. One skilled in the art would understand that secondary work queue 132 can alternatively have a larger or smaller number of slots or alternatively, the number of slots in secondary work queue 132 can be variable. When the secondary work queue 132 is to be used, these slots will be filled by interprocess communication resource scheduler 130 as will be described in detail below. Conversely, when secondary work queue 132 is not being used, the contents of secondary work queue 132 are emptied or otherwise ignored.

To provide the information for populating secondary work queue 132, resource monitoring logic 144 monitors the use of interprocess communication resources 102 and maintains interprocess communication resources database structure 146. Whenever a resource such as shared memory 104, semaphores 106, message queues 108, sockets 110 or signals 112 is used, resource monitoring logic 144 determines the task for which the resource is pending and stores that information. For example, a task can use a semaphore 106 to indicate that the task has exclusive use of a shared resource such as memory. The initiating task is the only task that can release the shared memory space, so the semaphore is pending for the initiating task. For another example, an originating task uses a message queue 108 to send a message to a receiving task. Message queue 108 is used for one-way communication; the receiving task must read and then release the message. In this example, the message is pending on the receiving task.

In addition to tracking the resources pending for each task, resource monitoring logic 144 also monitors the total amount of the resource that is in use for each resource type. A threshold can be set for each resource individually, as well as a threshold for the total interprocess communication resources 102 in use. These thresholds may be configured when the system is initialized and can be optimized to the specific application and available resources. In one embodiment, weights are applied to the use of at least one resource type, reflecting that some resources are more important than other resources for a given application.

Resource monitoring logic 144 can be a separate task operating outside of processing unit 100, as shown in FIG. 1A, or can alternatively be integrated into processing unit 100. As processing in processing unit 100 becomes increasingly complex, tracking resources becomes increasingly important. If necessary, resource monitoring logic 144 can be run on a separate processor that is dedicated to the task of monitoring resources.

Additionally, although interprocess resource scheduler 130 is shown as part of scheduler 126 and processing unit 100, this scheduler can also be implemented outside of processing unit 100, either in conjunction with resource monitoring logic 144 or as a separate module. One skilled in the art will realize that the interprocess resource scheduler 130 and resource monitoring logic 144 described in regard to this Figure can be implemented in hardware, in software, in firmware, or in any combination and still fall within the scope of the invention.

Figure 1B:
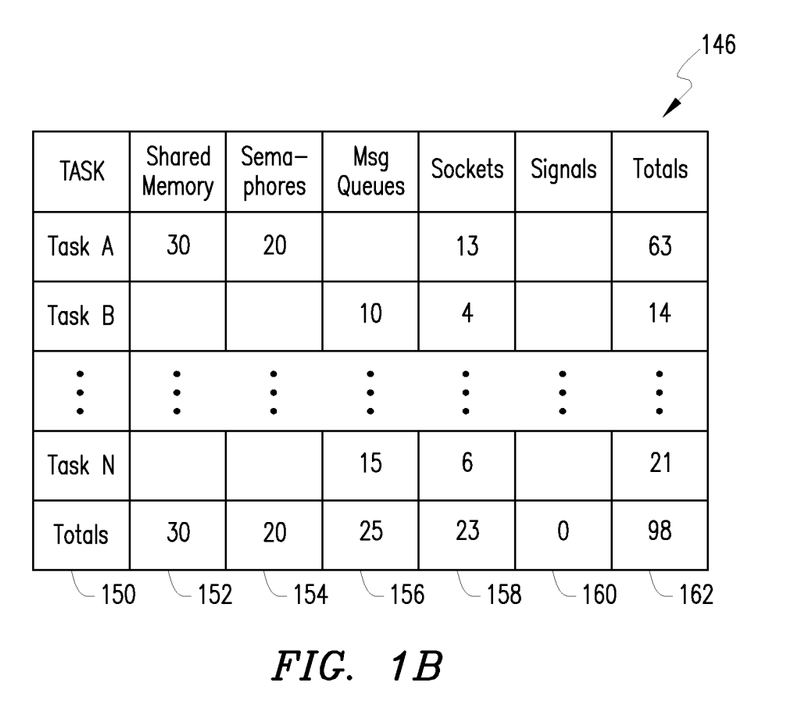
FIG. 1B discloses an exemplary interprocess communication resources database structure in accordance with an embodiment of the present invention.

In one embodiment, the processing unit shown in FIG. 1A is operable in an Ethernet switch that operates at L2/L3 of the Open System Interconnection (OSI) standard. Referring now to FIG. 1B, an exemplary interprocess communication resources database structure 146 is disclosed in greater detail. In this embodiment, interprocess communication resources database structure 146 contains a row for each task in primary work queue 114 that has resources pending. If a task does not have any resources pending, that task may not be populated in interprocess communication resources database structure 146. By way of illustration, identification for the task is stored in column 150, while column 152 stores the pending resources in shared memory, column 154 stores the pending resources in semaphores, column 156 stores the pending resources in message queues, column 158 stores the pending resources in sockets, and column 160 stores the pending resources in signals. Finally, column 162 contains a total value for the interprocess communication resources held by a task. The last row of interprocess communication resources database structure 146 contains totals for each type of interprocess communication resources. Entries in database structure 146 can be maintained in any order. However, in at least one embodiment, the entries are sorted according to the total volume of resources pending for the task.

When interprocess communication resources database structure 146 is used to populate secondary work queue 132, the tasks can be sorted according to any factor that best meets the requirements of processing unit 100 while furthering the need to release resources. In at least one embodiment, secondary work queue 132 is sorted by volume of resources pending. One additional condition is used when populating secondary work queue 132 from interprocess communication resources database structure 146. If a task is already receiving processing time in primary queue 114, that task will not be placed into secondary work queue 132.

Figure 2:
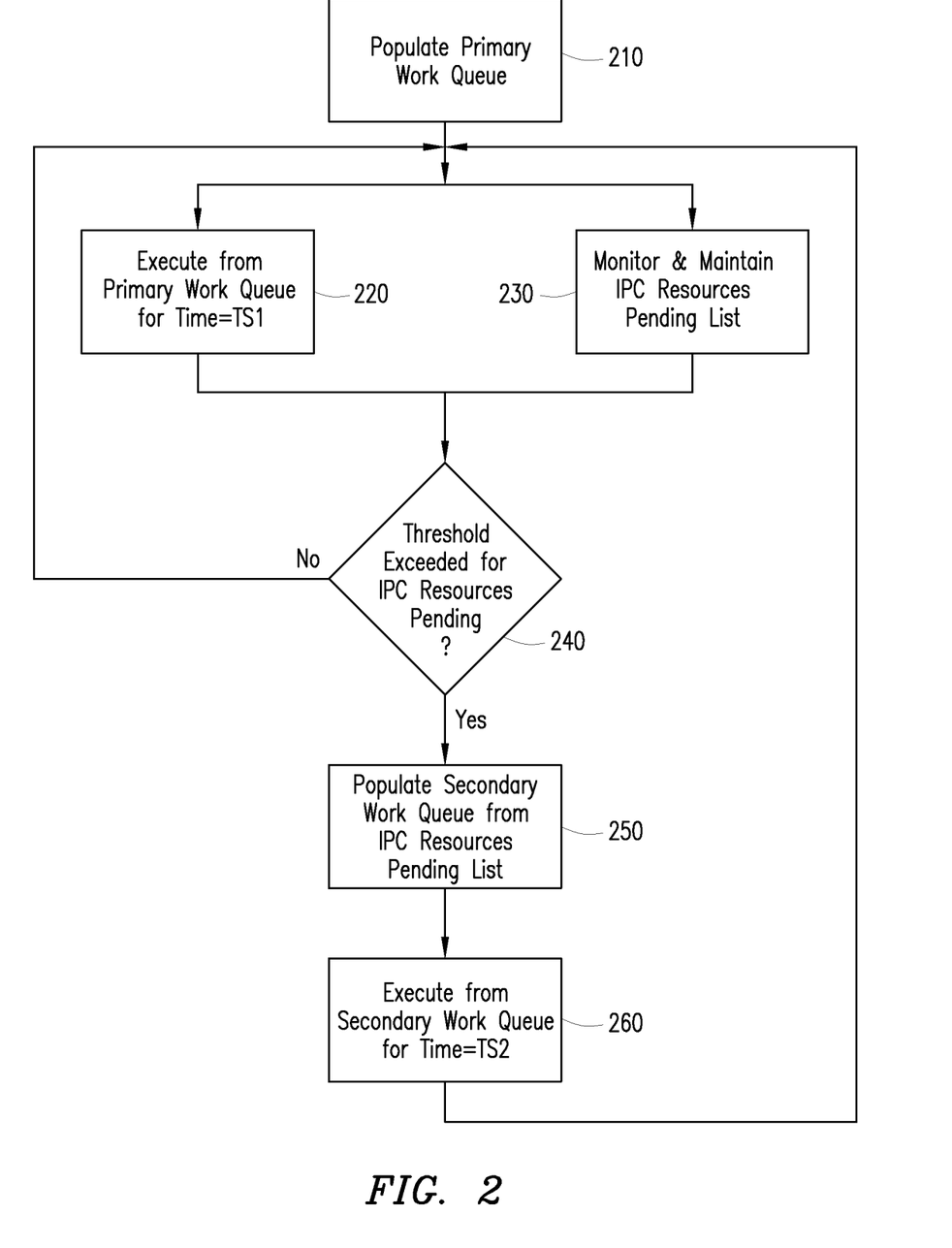
FIG. 2 discloses a scheme for scheduling tasks in accordance with an embodiment of the present invention.

With reference now to FIG. 2, a scheme for scheduling tasks in a resource-limited environment will be discussed. Initially, the system populates a primary work queue, such as primary work queue 114, in block 210, using any desired algorithm. The algorithms most commonly used are preemptive priority scheduling, in which higher priority tasks always preempt lower priority tasks that are executing, and round robin scheduling, in which each task in turn is given an equal amount of processor time, or a variation or combination of these two algorithms. Additionally, one skilled in the art will recognize that while not specifically shown in the designated scheme, new tasks can be added to the primary work queue at any time, as they are received.

Once the primary work queue is established, the system executes from the primary work queue for a time period designated TS1, as shown in block 220. At the same time, the system monitors the use of interprocess communication resources and maintains an interprocess communication resource pending list for each task in the primary work queue, shown in block 230. Maintenance of the interprocess communication resource pending list also includes maintaining totals for the resources, as discussed above. At the end of time period TS1, the system determines whether any threshold of interprocess communication resources pending has been exceeded in block 240. If no threshold has been exceeded, the system continues to execute from the primary work queue for another time period TS1. If a threshold has been exceeded, at least some of the resources may be released in order for processing to continue. When each interprocess communication resource is tracked separately, one or more thresholds may have been exceeded.

Once the determination has been made that resources should be released, the system populates the secondary work queue is populated with those tasks that can release the most resources within the overall context of the specific system, as shown in block 250. Two specific schemes for populating the secondary work queue will be discussed in the examples that follow. These can include sorting the list by volume of interprocess resources pending and sorting by priority. Once the secondary work queue is populated, the system executes tasks from the secondary work queue for a time period designated TS2, shown in block 260. In at least one embodiment, time periods TS1 and TS2 can be configured at system startup. Once time period TS2 ends, processing of tasks from the primary work queue resumes for another time period TS1. In this manner, execution from the primary work queue alternates with execution from the secondary work queue whenever the total interprocess communication resources pending exceed a threshold.

Figure 3:
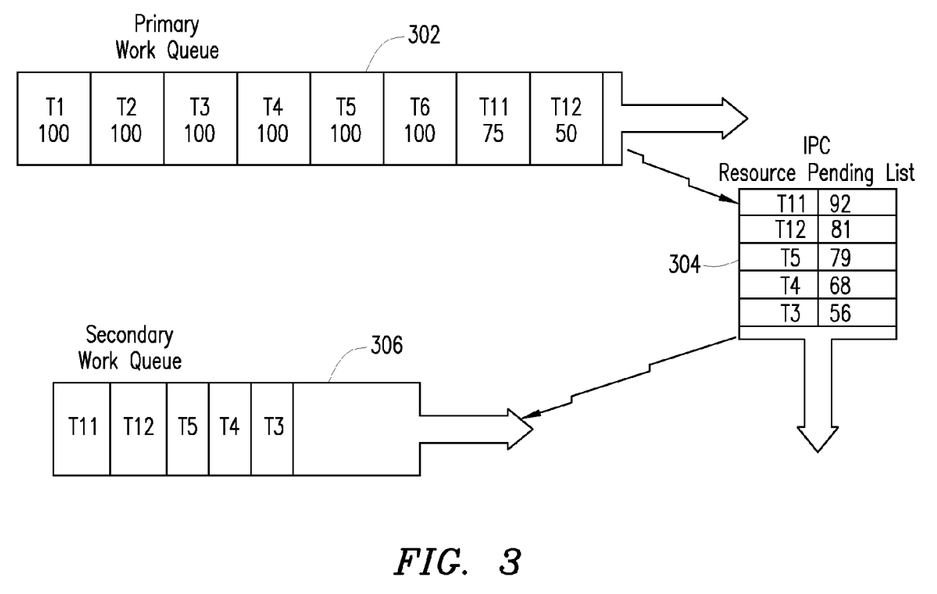
FIG. 3 discloses exemplary primary and secondary work queues that are operated according to an embodiment of the present invention.

Referring now to FIG. 3, exemplary work queues for one embodiment of the present invention are discussed. As shown in this Figure, primary work queue 302 contains tasks T1, T2, T3, T4, T5, T6, T11 and T12. Tasks T1 through T6 each have a priority of 100, while T11 has a priority of 75 and T12 has a priority of 50. In this example, primary work queue 302 is operated under preemptive priority scheduling, so that under this algorithm, T1 through T6 will be processed in the order they are received, because they have the same priority, while T11 and T12 must wait until all of T1 through T6 have completed. Interprocess communication resource pending list 304 shows the current usage of interprocess communication resources for each task, given in some arbitrary units. Each task listed in interprocess communication resource pending list 304 has one or more resource pending, with a total score for resources pending shown next to the associated task. For the sake of simplification in this explanation, several assumptions will be made. The scores reflect an overall use of resources and a single threshold is compared to overall resource usage. The value of the resources pending score for each task is assumed to remain the same throughout the explanation, except as this score is affected by the specific actions discussed. That is, the assumption is that no additional resources are made pending during the time period covered. One skilled in the art would understand that in practice, these numbers are constantly changing as the tasks are executed, using additional interprocess communication resources and releasing other interprocess communication resources.

In this example, task T11 has a resources pending score of 92, task T12 has a score of 81, task T5 has a score of 79, task T4 has a score of 68 and task T3 has a score of 56, again in some arbitrary units. Missing from the interprocess resources pending list are T1 and T2, which are assumed to have received processor time in TS1, and T6, which does not have any resources pending. Further, the threshold value is 200 and the secondary work queue is sorted by the volume of interprocess resources pending for each task. Because the resources pending score in the example totals 376, which exceeds the threshold of 200, secondary work queue 306 is populated from interprocess resource pending list 304; those tasks having the largest scores are sorted to execute first. In this manner, the greatest number of resources can be released during time slot TS2.

Figure 4:
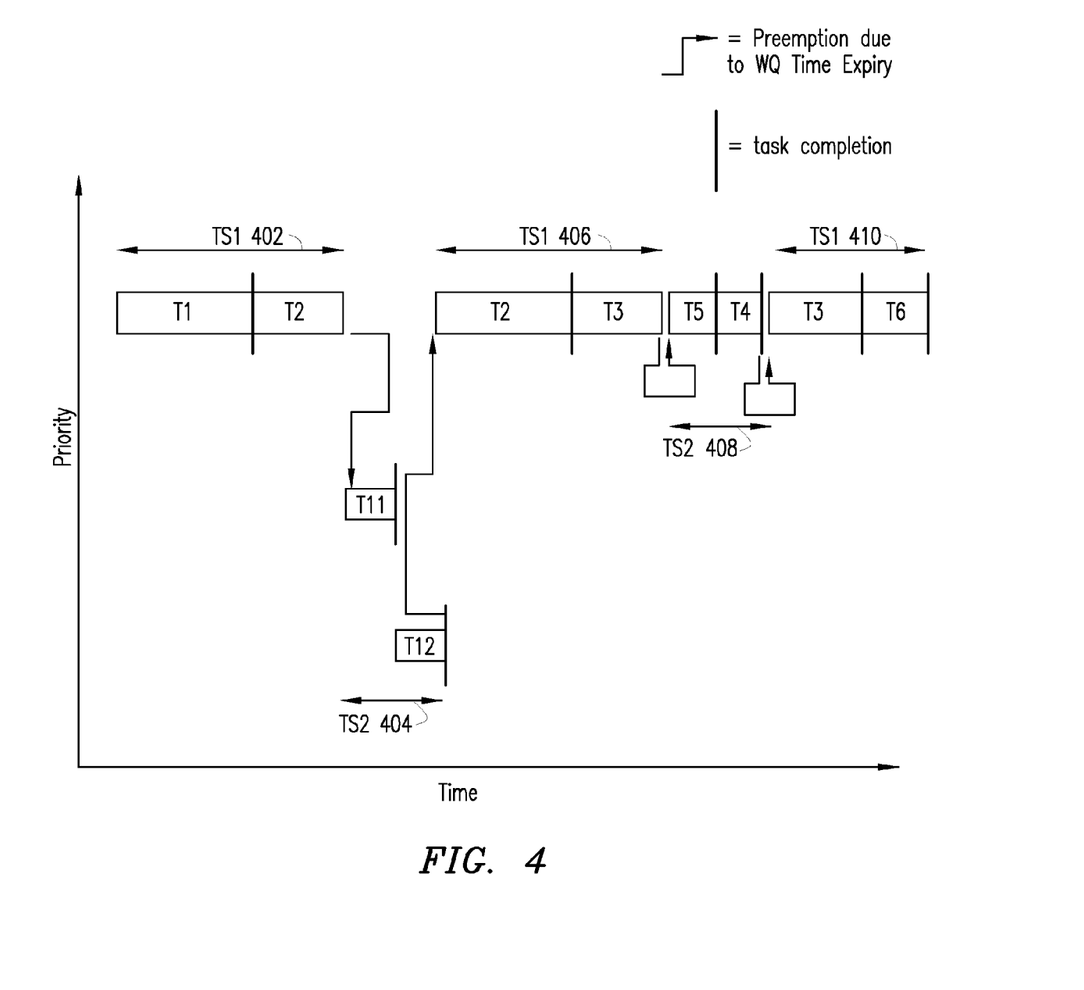
FIG. 4 shows the order of execution of the tasks in the work queues of FIG. 3 in accordance with an embodiment of the present invention.

FIG. 4 depicts an embodiment of the inventive scheme as applied to the work queues of FIG. 3. At the beginning of time slot TS1 402, the system operates from primary work queue 302, so that task T1 is executed first. T1 completes execution and is removed from primary work queue 302, and then the execution of task T2 begins. At the end of time slot TS1 402, the processor checks the total resources pending against the threshold and determines that the threshold has been exceeded. At this point, the system shifts to populate and then execute from the secondary work queue 306.

In this example, interprocess communication resource pending list 304 is ordered according to volume of resources pending for execution in secondary work queue 306, so the entries are copied to secondary work queue 306 in this order. During time slot TS2 404, task T11 is executed to completion and then task T12 is executed, with task T12 completing at the expiration of time slot TS2 404. As T11 and T12 are each completed, they are removed from both secondary work queue 306 and from primary work queue 302.

According to this example, 173 units of resources pending for T11 and T12 were released as tasks T11 and T12 were executed. At the end of time slot TS2 404, the system resumes execution from primary work queue 302. Task T2 was previously interrupted prior to completion by the expiration of time slot TS1 402; therefore execution from the primary work queue resumes with task T2, which is shown as being completed and task T3 begun during time slot TS1 406. At the expiration of time slot TS1 406, the system again compares the total resources pending to the threshold. Despite the fact that tasks T11 and T12 executed to completion during the previous TS2 time slot 404 and were removed from the queue, the total resources pending equals 203 units, which still exceeds the threshold value of 200 units. Therefore, the system again populates secondary work queue 306 and executes from secondary work queue 306 for time period TS2 408. Task T3 received processing time in the primary work queue and will not be placed in secondary work queue 306, while both T11 and T12 have executed and been removed from the queues. Task T5 is therefore executed first, followed by task T4. At the completion of time slot TS2 408, an additional 147 resources have been released by these two tasks. Finally, the processor returns to primary work queue 302 and executes task T3 to completion, then executes task T6 to completion, so that the exemplary work queue is now empty.

It should be understood, as noted earlier, that tasks would normally be added to the primary work queue as the existing tasks are being executed. Additionally, the values of the resources pending for each task can alter between successive time slots TS2. For this reason, secondary work queue 306 is repopulated each time the system switches to execute from secondary work queue 306.

Figure 5:
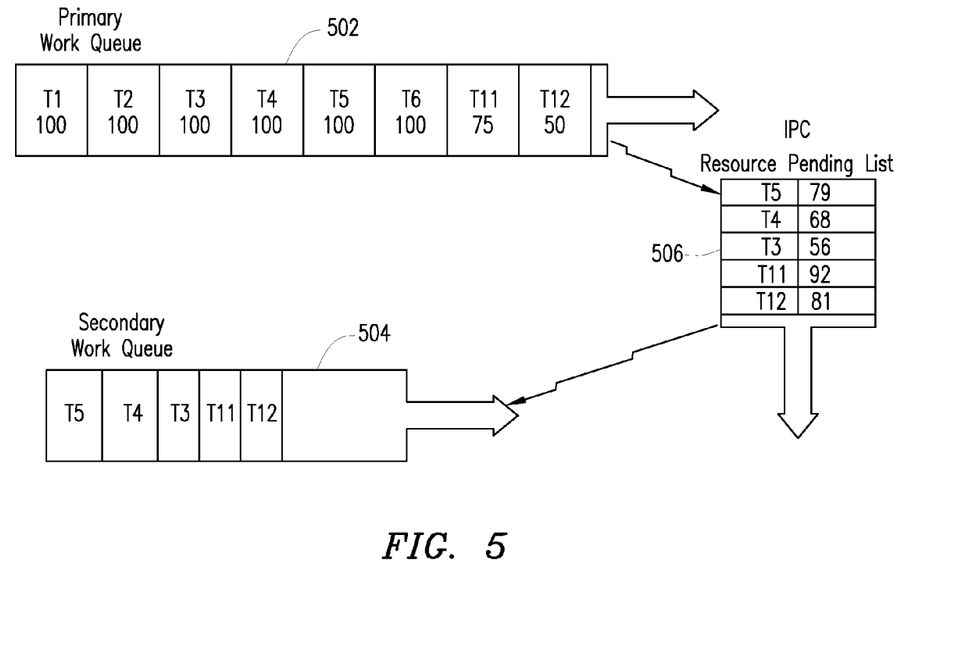
FIG. 5 discloses exemplary primary and secondary work queues that are operated in accordance with an embodiment of the present invention.

FIG. 5 depicts an alternate embodiment of the disclosed invention, demonstrating that other criteria can be used to order the secondary work queue. Primary work queue 502 has been populated with the same tasks T1, T2, T3, T4, T5, T6, T11 and T12 as in the prior example. Additionally, these tasks retain the same priority as in the prior example. However, in this example, two elements are different: (a) the interprocess resource pending list is sorted by the priority of the associated task, although for tasks sharing a same priority, their order is reversed from the order of primary work queue 502 and (b) the threshold is set to 75. Task T6 again does not appear in interprocess communication resources pending list 504 because this task has no pending resources. Interprocess communication resource pending list 506 orders the tasks as T5, T4, T3, T11 and T12. When secondary work queue 504 is populated, secondary work queue 504 is ordered in the same manner as interprocess communication resource pending list 506.

Figure 6:
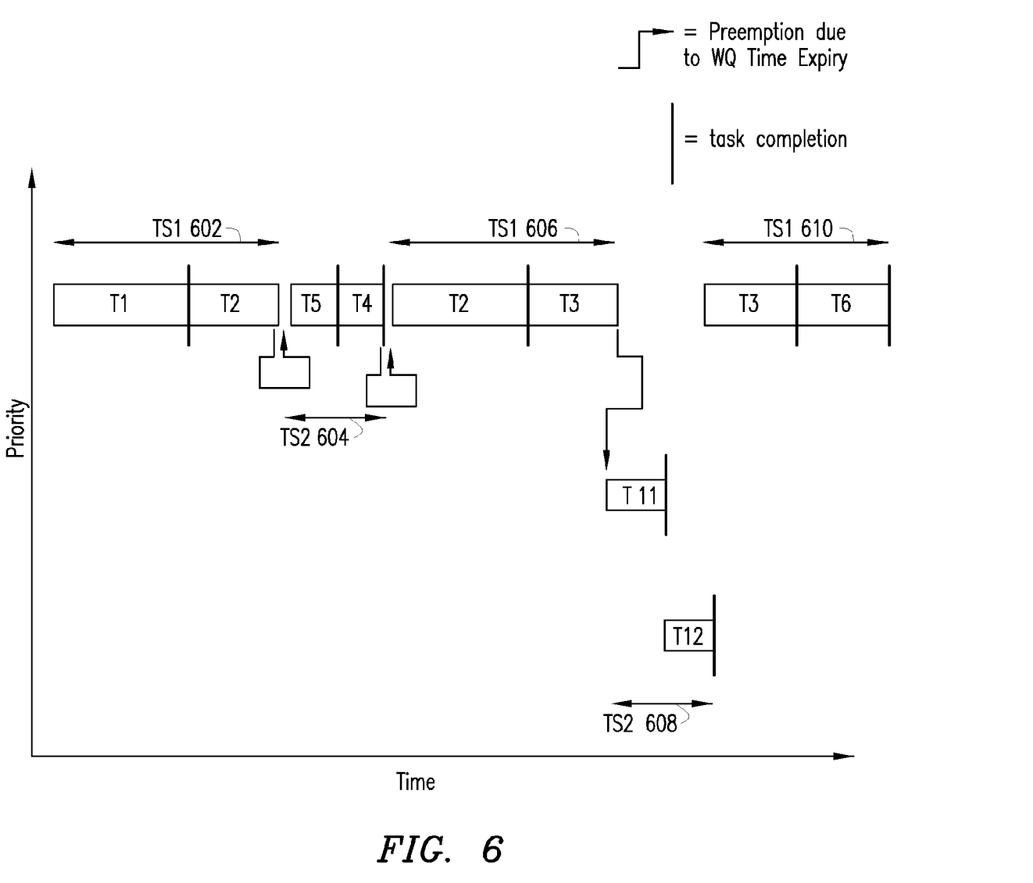
FIG. 6 shows the order of execution of the tasks in the work queues of FIG. 5 in accordance with an embodiment of the present invention.

FIG. 6 depicts the execution of tasks from the work queues of FIG. 5. At the beginning of time period TS1 602, the system executes from primary work queue 502, beginning with task T1 and upon completion of task T1, begins execution of task T2. As in the earlier example, before task T2 can run to completion, the end of time period TS1 502 is reached. The system determines that the resources pending are greater than the threshold, i.e., 376>75. As a result, secondary work queue 506 is populated with the entries from interprocess resource pending list 504. Once secondary work queue 506 is populated, the system executes from secondary work queue 504, beginning with task T5. During time period TS2 604, task T5 and then task T4 each run to completion. Then, as time period TS2 604 ends, the execution of task T2 from primary work queue 502 resumes.

The system executes from primary work queue 502 for time period TS1 606, during which time task T2 runs to completion and task T3 begins executing. At the end of time period TS1 606, the system determines that the resources pending are 81 units. This value is greater than the threshold of 75 units; therefore, secondary work queue 506 is again populated. In this example, task T3 is no longer in interprocess communication resource pending list 504, because T3 received processor time during time period TS1 606. T11 is now at the head of secondary work queue 506, so task T11 is executed to completion and then task T12 is executed to completion during time period TS2 608. At the end of time period TS2 608, execution from primary work queue 602 resumes with task T3 executed to completion, then task T6 also executed to completion during time period TS1 610, emptying our exemplary queues.

The disclosed scheduling relies, at least in part, on the need to release shared resources that are limited in nature, such as the interprocess communication resources discussed above. The inventive scheduling can provide processing time to tasks having a lower priority as long as the tasks can release scarce system resources. By taking the use of limited resources into account when scheduling processor time, processor crashes due to lack of resources can be avoided. Two specific methods of ordering the resource pending list have been demonstrated, but other mechanisms can also be used to fine-tune the needs of a specific system while taking the scarcity of resources into account during scheduling.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method of scheduling tasks in a computer system, comprising:
   populating a primary work queue with a plurality of tasks;
   processing said plurality of tasks from said primary work queue, wherein said plurality of tasks consume interprocess communication resources operable to be released;
   monitoring said interprocess communication resources consumed by each task in said primary work queue;
   determining whether a volume of consumed interprocess communication resources exceeds a threshold based on said monitoring;
   processing tasks from a secondary work queue for a given time period, wherein said secondary work queue comprises tasks from said primary work queue that can release the greatest volume of interprocess communication resources, and wherein said tasks in said secondary work queue are sorted according to a respective priority value, wherein said threshold and said given time period are configurable at system initialization.

2. The method as recited in claim 1, further comprising monitoring the interprocess communication resources that can be released by each task in said primary work queue.

3. The method as recited in claim 1, wherein said tasks in said secondary work queue are further sorted according to a respective volume of interprocess communication resources that can be released.

4. The method as recited in claim 1, wherein said secondary work queue is populated prior to execution from said secondary work queue.

5. The method as recited in claim 1, wherein said primary work queue is executed according to preemptive priority scheduling.

6. The method as recited in claim 1, wherein a given task that has received processing time in said primary work queue is not used to populate said secondary work queue.

7. The method as recited in claim 1, wherein said interprocess communication resources are chosen from at least one of shared memory, semaphores, message queues, message pipes, sockets, and signals.

8. A method for scheduling tasks in a processor, the method comprising:
   populating a primary work queue with a plurality of tasks;
   processing said plurality of tasks from said primary work queue for a first time period;
   during execution of tasks from said primary work queue, maintaining a list of interprocess communication resources pending for each task in said primary work queue;
   determining, after said first time period, whether said interprocess communication resources pending has exceeded a threshold based on said maintained list of interprocess communication resources pending; and
   populating a secondary work queue with tasks having interprocess communication resources pending in response to said threshold has been exceeded, said secondary work queue being sorted according to a volume of resources pending for a task; and
   executing tasks from said secondary work queue for a second time period before returning to the execution of tasks from said primary work queue, wherein said threshold, said first time period and said second time period are configurable at system initialization.

9. The method for scheduling tasks as recited in claim 8, wherein said secondary work queue being further sorted according to a priority value associated with a task in said resources pending list.

10. The method for scheduling tasks as recited in claim 8, wherein each of said resources has an upper limit.

11. The method for scheduling tasks as recited in claim 8, wherein said resources are chosen from at least one of shared memory, semaphores, message queues, message pipes, sockets and signals.

12. The method for scheduling tasks as recited in claim 8, wherein said secondary work queue is populated prior to execution from said secondary work queue.

13. The method for scheduling tasks as recited in claim 8, wherein said primary work queue is executed according to at least one of preemptive priority scheduling, weighted round robin scheduling, and weighted deficit round robin scheduling.

14. The method for scheduling tasks as recited in claim 8, wherein a given task that has received processing time in said primary work queue is not used to populate said secondary work queue.

15. A system, comprising:
  means for populating a first work queue with a plurality of tasks;
  means for processing said plurality of tasks from said first work queue for a first period of time;
  means for maintaining a list of interprocess communication resources pending for each of said plurality of tasks during execution of tasks from said first work queue;
  means for determining, after said first time period, whether said interprocess communication resources pending has exceeded a threshold based on said maintained list of interprocess communication resources;
  means for populating a second work queue with tasks having interprocess communication resources pending in response to said threshold has been exceeded, wherein said second work queue is ordered according to a respective volume of interprocess communication resources pending for each of said plurality of tasks;
  means for processing tasks from said second work queue for a second period of time before returning to the processing of tasks from said first work queue, wherein said threshold, said first period of time and said second period of time are configurable at system initialization; and
  a processor.

16. The system as recited in claim 15, wherein said means for populating said first work queue uses one of preemptive priority scheduling, weighted round robin scheduling, and weighted deficit round robin scheduling.

17. The system as recited in claim 15, wherein said means for maintaining is implemented as hardware.

18. The system as recited in claim 15, wherein a given task that has received processing time in said first work queue is not used to populate said second work queue.

19. The system as recited in claim 15, wherein said interprocess communication resources are chosen from at least one of shared memory, semaphores, message queues, message pipes, sockets, and signals.

20. The system as recited in claim 15, wherein said second work queue is populated prior to execution from said second work queue.

* * * * *